United States Patent [19]

Hughes et al.

[11] 4,285,524
[45] Aug. 25, 1981

[54] STYLUS CLEANING APPARATUS FOR VIDEO DISC PLAYER

[75] Inventors: Larry M. Hughes; Kenneth L. George, both of Indianapolis, Ind.

[73] Assignee: RCA Corporation, New York, N.Y.

[21] Appl. No.: 122,959

[22] Filed: Feb. 21, 1980

[51] Int. Cl.³ ............................................. G11B 3/58
[52] U.S. Cl. ........................................ 369/71; 369/77
[58] Field of Search ............. 274/47, 1 R, 23 A, 9 B; 358/128.5

[56] References Cited

U.S. PATENT DOCUMENTS

| 3,881,734 | 5/1975 | Leedom | 274/1 R |
| 4,046,384 | 9/1977 | Kirschner | 274/47 |
| 4,166,623 | 9/1979 | Nanbu et al. | 274/1 R |

Primary Examiner—Harry N. Haroian
Attorney, Agent, or Firm—E. M. Whitacre; J. S. Tripoli; D. A. Kulkarni

[57] ABSTRACT

A stylus cleaner arm is pushed back to a retracted position when a record-bearing caddy is inserted into the player to load an enclosed record therein. The cleaner arm is held in the retracted position by the retained spine upon subsequent jacket withdrawal. The cleaner arm follows the caddy as it is withdrawn from the player until it engages a latch plate, which arrests the cleaner arm at an intermediate position. The stylus lifter gently drops a pickup stylus on the cleaner arm occupying the intermediate position as the caddy is further withdrawn from the player. The latch plate frees the cleaner arm to swing back to a standby position thereof during still further withdrawal of the caddy, thereby passing the cleaner arm underneath the stylus to wipe it clean. The stylus is raised away from the cleaner arm when the caddy is withdrawn from the player.

7 Claims, 8 Drawing Figures

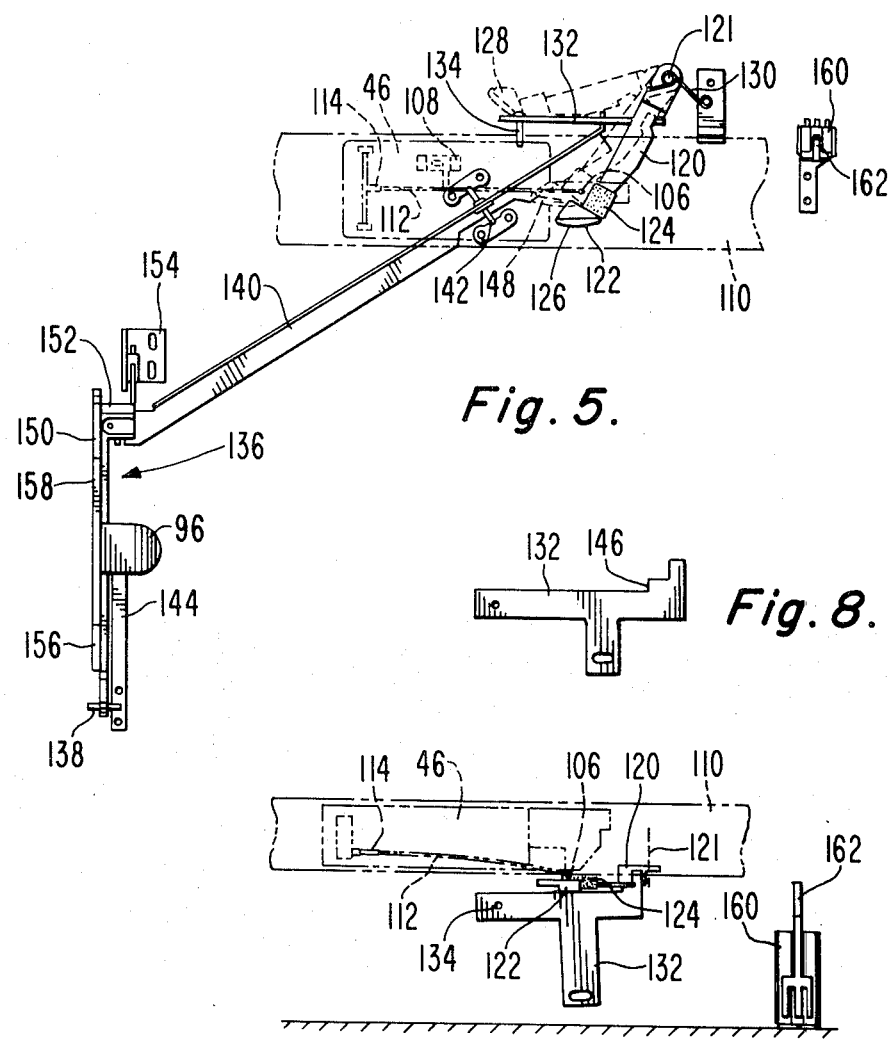
Fig. 5.
Fig. 8.
Fig. 7.
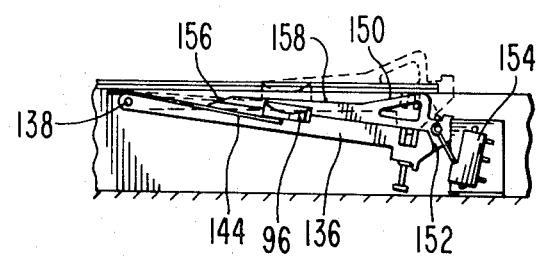
Fig. 6.

STYLUS CLEANING APPARATUS FOR VIDEO DISC PLAYER

This invention relates to record players, and more particularly, to a system for automatically cleaning the stylus employed in the video disc player.

In certain disc systems, video information is stored on a disc record in the form of geometric variations in a continuous spiral track disposed on the record surface. The variations in capacitance between an electrode carried by a record-engaging stylus and a conductive property of the record are sensed to reproduce the stored information. A capacitance-type video disc system is illustratively disclosed in U.S. Pat. No. 3,842,194 (Clemens).

To protect the video disc, it is beneficial to enclose it in a caddy which comprises an outer jacket and a record retaining spine. For record loading, a full caddy is inserted into an input slot provided in the player. A record extraction mechanism disposed in the player removes the record/spine assembly from the jacket, and retains it in the player, during subsequent jacket withdrawal. The retained record is transferred to a turntable for playback. For subsequent record retrieval, an empty jacket is inserted into the player, whereby the record/spine assembly is returned back into the caddy. Withdrawal of the caddy from the player effects record retrieval. Reference is made to U.S. Pat. Nos. 4,159,827 and 4,133,540 (Torrington) for examples of a video disc caddy and a record extraction mechanism.

In some video disc systems, a pickup cartridge is used to protect the stylus for handling damage. The stylus arm supports the pickup stylus at one end thereof and has its other end secured to the pickup cartridge by means of a compliant coupler. The cartridge is, in turn, received in an arm carriage with a bottom opening through which the stylus protrudes for record engagement. During playback, the carriage is driven in a radial direction over the record in synchronism with the radial motion of the stylus. U.S. Pat. No. 4,053,161 (Bleazey, et al.) describes an illustrative stylus lifting/lowering apparatus (i.e., stylus lifter for effecting selective record engagement.

In an arrangement described in U.S. patent application, Ser. No. 964,531, filed on Nov. 29, 1978 in behalf of L. A. Torrington, the carriage is translated toward the record center along a path disposed substantially parallel to the path of caddy travel. The jacket engages the carriage to push it back to a starting position when it is inserted into the player for record retrieval.

In the course of playback operations, an accumulation of debris of various form (e.g., particles of material fragmented from stylus or disc) on the stylus tip can develop, which may interfere with proper sensing of the minute groove bottom variations. To reduce adverse effects of such debris accumulation, the present invention provides a system for automatically cleaning the stylus.

In accordance with the present invention, a cleaner arm is mounted in the player such that it engages an occupied caddy during its arrival at a fully inserted position in the player for effecting deflection thereof from a standby position to a retracted position. The cleaner arm is biased toward its standby position. The retained spine holds the cleaner arm in the retracted position against the above-mentioned bias. A latch plate, mounted in the player, is subject to displacement from a depressed location to a raised location in response to insertion of an empty jacket into the player for record retrieval. The raised latch plate engages the cleaner arm during its travel, in response to withdrawal of the occupied caddy, from the retracted position toward the standby position for detaining the cleaner arm at an intermediate position. The latch plate is subject to motion to the depressed location thereof in response to the occupied caddy withdrawal, thereby releasing the detained cleaner arm to swing back to the standby position. The location of the intermediate position of the cleaner arm is such that it passes underneath the pickup stylus to wipe it clean as it swings to the standby position.

Pursuant to a further feature of the subject invention, the stylus is lowered onto the wiping pad arranged on the cleaner arm in response to the occupied caddy withdrawal prior to the freeing of the detained cleaner arm.

According to a still further aspect of the instant invention, the location of the intermediate position of the cleaner arm is such that the wiping pad is disposed beneath the stylus during the occupation of the starting position by the carriage.

In accordance with still another feature of this invention, a switch, responsive to the retained spine, disables the stylus lifter apparatus to preclude lowering of the pickup stylus on a retained record during the record load/unload operation.

In the drawings:

FIG. 2 depicts a protective video disc caddy suitable for use with the stylus cleaning apparatus of FIG. 1 in practice of the present invention;

Figure 1:
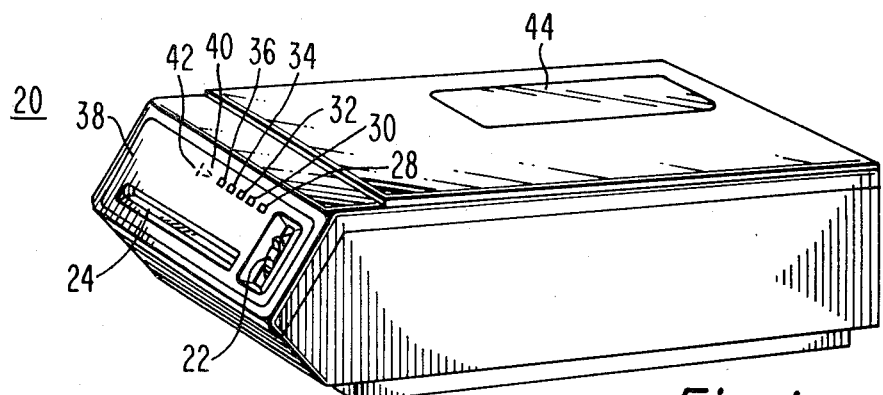
FIG. 1 shows a video disc player having the stylus cleaning apparatus in accordance with the present invention.
Figure 3:
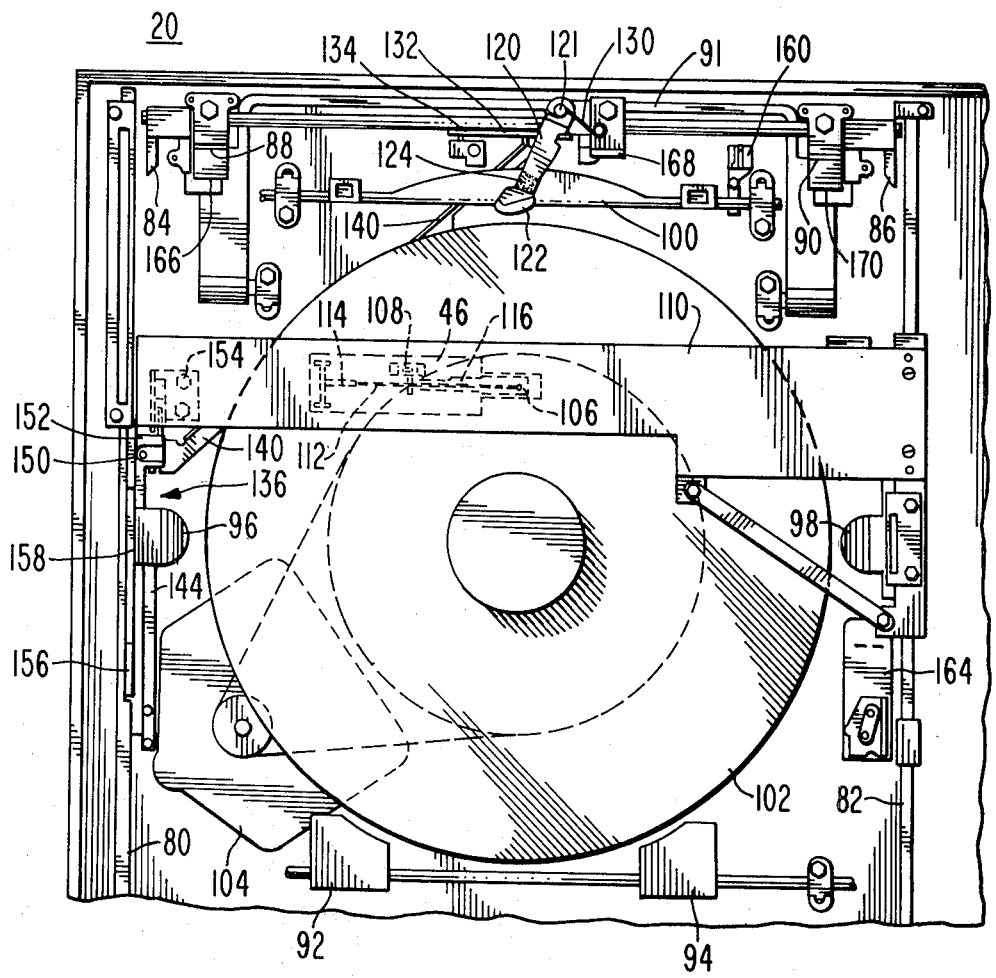
Figure 4:
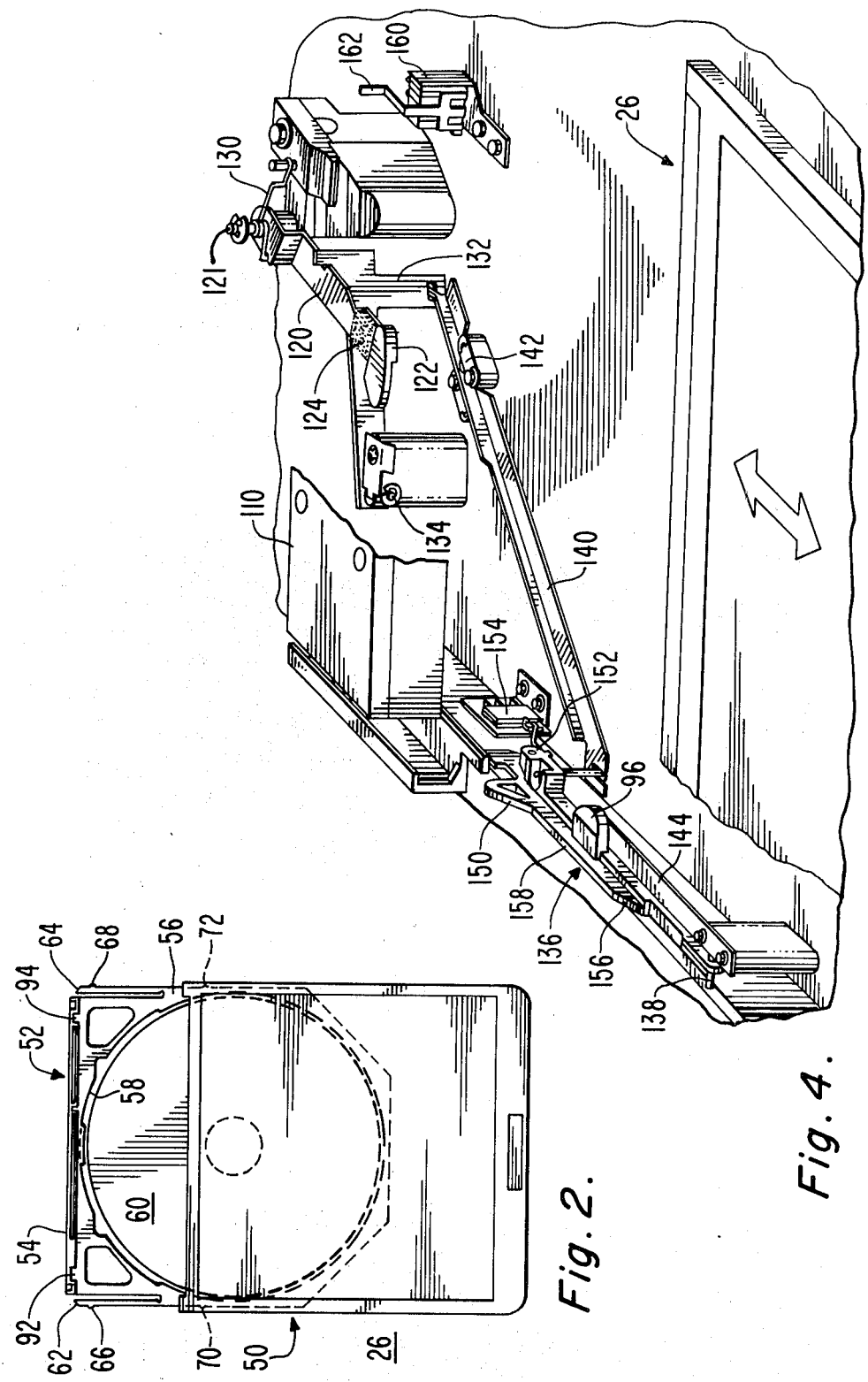

FIG. 3 provides a partial plan view of the video disc player of FIG. 1 showing the details of the subject stylus cleaning apparatus;

FIG. 4 is a perspective view of the stylus cleaning apparatus in association with cooperating mechanisms of the video disc player of FIGS. 1 and 3;

FIGS. 5, 6 and 7 respectively provide the plan view, the side view and the front view of the stylus cleaning apparatus of FIGS. 1, 3 and 4; and FIG. 8 shows details of a component of the stylus cleaning apparatus of FIGS. 1, 3 and 4–7.

Shown in FIG. 1 is a video disc player 20 having the subject stylus cleaning apparatus. A function lever 22 is subject to disposition in any one of three positions—OFF, PLAY and LOAD/UNLOAD. A door flap closes a caddy input slot 24 when the function lever 22 is disposed in the OFF and PLAY positions. In the LOAD/UNLOAD position of the function lever 22, the door flap is opened to permit insertion of a full caddy 26, shown in FIG. 2, into the player in order to load an enclosed record into the player. A pushbutton 28 is provided to dispose the player in the "PAUSE" mode. A set of pushbuttons 30, 32, 34 and 36 are arranged on the instrument panel 38 to dispose the player in any one of the four "SEARCH" modes, i.e., fast forward/reverse and scan forward/reverse. A digital readout 40 provides an indication of playing time and other functions, such as, PAUSE, LOAD/UNLOAD and END-OF-PLAY, etc. A pair of tally lights 42 are operated to provide an indication of the record side subject to play, e.g., "SIDE 1" and "SIDE 2." An access door 44 is disposed on the cover of the player to provide access to a stylus cartridge 46 (FIG. 3).

As shown in FIG. 2, the video disc caddy 26, suitable for use with the present stylus cleaning apparatus, comprises a jacket 50 having an edge opening and a substantially planar, record retaining spine 52. The record retaining spine 52 has a portion 54 which serves as a closure when the spine is fully inserted into the jacket, and a further portion 56 having a circular opening 58 for receiving a record 60. The spine 52 is further provided with a pair of integrally-molded, flexural latch fingers 62 and 64. Each of the spine latch fingers 62 and 64 has a protruding element 66 and 68. The protruding elements 66 and 68 are received in pockets 70 and 72 disposed in the jacket 50 for locking the spine 52 in place when it is fully inserted therein.

The operation of the caddy extraction mechanism will be first explained in conjunction with FIG. 3. To load a record into the player, a full caddy is inserted into the player along a path defined by guideways 80 and 82. As the caddy arrives at a fully inserted position in the player, a pair of latch defeat members 84 and 86 enter the jacket 50 to defeat the spine latch fingers 62 and 64 for freeing the spine 52 from the jacket. Pivotally mounted in the player are a pair of spine gripper members 88 and 90 which are received in a pair of cutouts 92 and 94, arranged in the spine 52, when the caddy arrives at the fully inserted position in the player in order to lock the spine to the player. Since the spine 52 is released from the jacket 50 through the operation of the latch defeat members 84 and 86 and latched to the player through the operation of the spine gripper members 88 and 90, subsequent withdrawal of the jacket leaves the record/spine assembly in the player. The spring-loaded receiver pads 92, 94, 96, 98 and 100 serve to accurately locate the retained spine/record assembly in the player. A pair of springs (not shown) disposed between a gripper arm 91, carrying the spine gripper members 88 and 90, and the latch defeat members 84 and 86 effect downward deflection of the latch defeat members during jacket withdrawal.

To transfer the retained record to a turntable 102, the function lever 22 is moved to the PLAY position, which, in turn, raises the turntable and starts a turntable motor 104. The retained record is picked up as the turntable 102 is raised, leaving the spine 52 resting on the receiver pads 92, 94, 96, 98 and 100. A pickup stylus 106 is gently lowered onto the information track disposed on the record by means of a stylus lifter 108 (for example, of the type described in U.S. Pat. No. 4,053,161) mounted in a carriage 110. The pickup stylus 106 is disposed at one end of a stylus arm 112, the other end of which is flexibly secured to the cartridge 46 by means of a rubber coupler 114. Disposed in the bottom wall of the carriage 110 is an opening 116 through which the stylus 106 is selectively lowered for record engagement. During playback, the carriage 110 is translated from a starting position at the back of the player toward the front of the player in synchronism with the radially inward motion of the pickup stylus 106. The recovered signals are processed to reconstruct a standard television signal containing picture and sound information for application to a television receiver.

To transfer the record back to the receiver pads 92, 94, 96, 98 and 100, the function lever 22 is shifted back to the LOAD/UNLOAD position, which, in turn, lowers the turntable 102 to a height below the receiver pads. To retrieve the record from the player, an empty jacket 50 is inserted into the player through the input slot 24 along the guideways 80 and 82. As the jacket 50 arrives at the fully inserted position in the player, the front edge thereof engages the deflected latch defeat members 84 and 86 to cause further downward deflection thereof. Such further downward deflection of the latch defeat members 84 and 86, in turn, effect downward displacement of the spine gripper members 88 and 90, whereby the spine 52 is freed from the gripper arm 91. When the jacket 50 is fully inserted into the player, the spine latch fingers 62 and 64 snap back into the pockets 70 and 72 to lock the spine 52 to the jacket. The record/spine assembly is retrieved from the player when the caddy is withdrawn.

As indicated previously, the carriage 110 is translated from the starting position thereof at the back of the player toward the record center during playback. When an empty jacket 50 is inserted into the player for record retrieval, the front edge thereof engages the carriage 110 to push the carriage back to the starting position at the rear of the player.

The stylus cleaning apparatus according to the present invention will now be described in conjunction with FIGS. 3-8. The subject stylus cleaning apparatus includes a cleaner arm 120 pivotally mounted in the player by means of a pivot pin 121. Disposed on the cleaner arm 120, adjacent to the free end 122 thereof, is a wiping pad 124. The free end 122 of the cleaner arm 120 is engaged by the front edge of the caddy 26 during the travel of the caddy to the fully inserted position in the player for effecting motion of the cleaner arm from a standby position 126 to a retracted position 128 (FIG. 5). The retained spine 52 holds the cleaner arm 120 in the retracted position after the jacket 50 is withdrawn from the player. A spring 130 provides a bias force on the cleaner arm 120 which urges the cleaner arm toward the standby position 126.

A latch plate 132 is pivotally mounted in the player about a pin 134. The latch plate 132 is arranged for displacement from a depressed position to a raised position in response to caddy insertion. The mechanism for causing such displacement of the latch plate 132 includes an actuating cam 136 pivotally arranged in the player by means of a pivot pin 138. A latch lever 140 pivotally mounted in the player about a pin 142 connects the actuating cam 136 to the latch plate 132 in the manner shown in FIG. 4. A leaf spring 144 biases the actuating cam 136 to return to the elevated position thereof so that the latch plate 132 is disposed in the depressed position in response to caddy withdrawal. FIG. 6 illustrates the lowered and the elevated position (shown in phantom) of the actuating cam 136.

Disposed on the latch plate 132 is a notch 146, as shown in FIG. 8, which is arranged such that it arrests the cleaner arm 120 during its travel from the retracted position 128 toward the standby position 126 during caddy withdrawal for detaining the cleaner arm at an intermediate position 148 (FIG. 5). The location of the intermediate position 148 is such that the cleaning pad 124 is disposed beneath the stylus 106 when the carriage 110 is disposed at the starting position thereof in the manner shown in FIG. 5.

When the front edge of the caddy 26 arrives in the region of a section 150 of the actuating cam 136 during caddy withdrawal, a tapered portion 152 of the actuating cam activates a microswitch 154 (FIGS. 4 and 6). The stylus lifter 108 gently lowers the stylus 106 onto the cleaning pad 124, as illustrated in FIG. 7, when the microswitch 154 is activated. Although in the arrangement shown in FIG. 7, the intermediate position 148 of the cleaning pad 124 is directly beneath the stylus 106, in other arrangements, it is possible to have the intermediate position of the cleaning pad to the rear of the stylus. When the front edge of the caddy 26 arrives in the region of a section 156 of the actuating cam 136 during further caddy withdrawal, the actuating cam 136 sufficiently lowers the latch plate 132 to release the detained cleaner arm 120 to swing back to the standby position 126 thereof (FIG. 5). During such motion of the cleaner arm 120, the cleaning pad 124 passes underneath the stylus 106 to wipe it clean. As the actuating cam 136 is released from engagement with the front edge of the caddy 26 during still further caddy withdrawal, the microswitch 154 is deactivated, and the stylus lifter 108 raises the stylus 106 away from the cleaner arm 120. The actuating cam 136 is provided with an intermediate dwell section 158 to give the stylus lifter 108 sufficient time to lower the stylus 106 onto the cleaning pad 124 before the cleaner arm 120 is freed to swing back to the standby position 126 during caddy withdrawal.

To preclude the stylus lifter 108 from causing an undesired lowering of the stylus 106 onto a retained record (e.g., during withdrawal of an empty jacket subsequent to a full insertion of an occupied caddy into the player, and during insertion of an empty jacket into the player for record retrieval), the player is provided with a normally-closed, spine-actuated microswitch 160, which is arranged in series with the cam-actuated microswitch 154. The retained spine 52 engages the blade 162 of the normally-closed microswitch 160 to disable to cam-actuated microswitch 154 in order to prevent it from activating the stylus lifter 108 during such engagement, i.e., at all times when the spine is held against the blade 162.

The operation of the stylus cleaning apparatus will be recapitalated. When a full caddy is inserted into the player to load a record therein, the front edge of the caddy engages the actuating cam 136 to activate, and then deactivate, the microswitch 154. The stylus lifter 108 lowers the stylus 106 in response to the activation of the cam-actuated microswitch 154. However, the cleaner arm 120 is disposed out of the way, in the standby position, when the stylus is lowered. The depression of the cam 136 by the caddy frees the latch plate 132 to rise, but the cleaner arm 120, when disposed over the latch plate, prevents the latch plate from moving to the raised position thereof. As the caddy arrives at the fully inserted position in the player, the front edge thereof pushes the cleaner arm 120 back to the retracted position 128. The stylus 106 is raised before the front edge of the caddy retracts the cleaner arm 120. The retained spine holds the cleaner arm 120 in the retracted position against the bias of the spring 130.

The cam 136 activates, and then deactivates, the microswitch 154 during withdrawal of the empty jacket. However, the spine-actuated microswitch 160 prevents the cam-actuated microswitch 154 from energizing the stylus lifter 108. The latch plate 132 returns to the depressed position in response to the elevation of the actuating cam 136 by the leaf spring 144 during jacket withdrawal. When the empty jacket is inserted into the player for record retrieval, the cam 136 activates, and then deactivates, the microswitch 154. But the spine-actuated microswitch 160 prevents the cam-actuated microswitch 154 from operating the stylus lifter 108 as mentioned above. Depression of the cam 136 by the caddy allows the latch plate 132 to move to the raised position. The jacket pushes the carriage 110 back to the starting position as it is inserted into the player.

The cleaner arm 120 follows the caddy under the influence of the spring 130 as the caddy is withdrawn from the player. The notch 146 in the latch plate 132 engages the cleaner arm 120 to detain it at the intermediate position 148 thereof. The first section 150 of the cam 136 actuates the microswitch 154 to lower the stylus 106 onto the cleaning pad 124. The dwell section 158 of the actuating cam 136 provides sufficient time to permit the stylus lifter 108 to lower the stylus 106 onto the cleaning pad 124 before the cleaner arm 120 is released to swing back to the standby position thereof. The third section 156 of the actuating cam 136 sufficiently lowers the latch plate 132 to release the detained cleaner arm 120 to swing back to the standby position 126 thereof, thereby passing the cleaning pad 124 underneath the stylus 106 to wipe the stylus clean. Further withdrawal of the caddy deactivates the cam-actuated microswitch 154 to raise the stylus away from the cleaner arm 120.

It will be noted that, in this particular embodiment, the record/spline receiver pad 96 is an integral part of the actuating cam 136. Disposed in the player is a caddy-operated record side identifier 164, shown in FIG. 3, which provides indication of the record side subject to playback on the tally lights 42 disposed on the player instrument panel 38. Reference is made to U.S. patent application, Ser. No. 98,411, filed for L. M. Hughes, and assigned to the same assignee as the instant assignee, for details of the record side identifier. The player is further provided with locating members 166, 168 and 170 to accurately register the retained spine in the player.

What is claimed is:

1. In a record player including a pickup stylus subject to engagement with a record for recovering prerecorded information disposed thereon during playback; said stylus being mounted at one end of a stylus arm supported in a carriage which is subject to translatory motion along a path between a starting position and an ending position; said record being subject to removable occupancy of a protective caddy comprising a jacket and a record retaining spine; said player having a record extraction mechanism for removing the record/spine assembly from said jacket, and retaining said record/spine assembly in said player, during jacket withdrawal subsequent to the insertion of an occupied caddy into said player to a fully inserted position along a further path disposed substantially parallel to said carriage path; wherein an empty jacket is inserted into said player along said further path to retrieve said record/spine assembly; stylus cleaning apparatus comprising:

(A) a cleaning element;
 (B) a cleaner arm movably mounted in said player and carrying said cleaning element; said cleaner arm being subject to engagement with said caddy during its travel to said fully inserted position in said player for effecting motion of said cleaner arm from a first position to a second position; said retained spine holding said cleaner arm at said second position during occupation of said player by said spine;
 (C) means for biasing said cleaner arm toward said first position; and
 (D) an actuated latch member mounted in said player; said actuated latch member being subject to motion from a first location to a second location in response to insertion of said caddy into said player; said actuated latch member, while occupying said second location, engaging said cleaner arm during motion thereof from said second position toward said first position in response to caddy withdrawal for holding said cleaner arm at an intermediate position between said first position and said second position; said actuated latch member being subject to movement from said second location to said first location in response to withdrawal of said carry from said player, thereby releasing said cleaner arm to return to said first position; the location of said intermediate position of said cleaner arm being such that said cleaning element wipes said pickup stylus during motion of said cleaner arm from said intermediate position to said first position.

2. The stylus cleaning apparatus of claim 1 further including means for lowering said stylus in a manner causing said stylus to protrude from said carriage; wherein said location of said intermediate position of said cleaner arm is such that said cleaning element is disposed beneath said stylus during disposition of said carriage at said starting position; said stylus cleaning apparatus additionally having activating means for energizing said stylus lowering apparatus during said caddy withdrawal in such manner that said stylus is resting on said cleaning element before said cleaner arm is released by said actuated latch member.

3. The stylus cleaning apparatus of claim 2 further including an actuating cam member arranged for disposition in said caddy insertion path in such manner that said actuating cam member is subject to motion between a normal position and a deflected position in response to a caddy insertion and a caddy withdrawal; said stylus cleaning apparatus further having means responsive to motion of said actuating cam member between said normal position and said deflected position for causing motion of said actuated latch member between said first location and said second location.

4. The stylus cleaning apparatus of claim 3 further having means, responsive to the retained spine, for disabling said activating means to preclude lowering of said stylus on a retained record during the record load-/unload operation.

5. Stylus cleaning apparatus for a disc record player, said player including a pickup stylus, said player being adapted for receiving said record in a first direction along a given path during loading of said record into said player and adapted for permitting withdrawal of said record in a second direction along said given path during unloading of said record from said player, said stylus cleaning apparatus comprising:

(A) a stylus cleaning element;
(B) first means responsive to the position of said record along said given path during withdrawal of said record from said player for causing said cleaning element to assume a first position; and
(C) second means responsive to the position of said record along said given path during a further withdrawal of said record from said player for translating said pickup stylus from a first position to a second position;

said first means being responsive to a still further withdrawal of said record from said player for causing movement of said cleaning element from said first position to a second position; said stylus second position being such that said stylus is wiped by said cleaning element during the travel of said cleaning element from said first cleaning element position to said second cleaning element position.

6. Stylus cleaning apparatus for a disc record player, said player including a pickup stylus, said player being adapted for receiving said record in a first direction along a given path during loading of said record into said player and adapted for permitting withdrawal of said record in a second direction along said given path during unloading of said record from said player, said stylus cleaning apparatus comprising:

(A) a stylus cleaning element;
(B) first means responsive to the full insertion of said record in said player for causing said cleaning element to assume a first position; said first means being responsive to a withdrawal of said record from said player for causing said cleaning element to assume a second position; and
(C) second means responsive to the position of said record along said given path during a further withdrawal of said record from said player for translating said pickup stylus from a first position to a second position;

said first means being responsive to a still further withdrawal of said record from said player for causing movement of said cleaning element from said second position to a third position; said stylus second position being such that said stylus is wiped by said cleaning element during the travel of said cleaning element from said second cleaning element position to said third cleaning element position.

7. Stylus cleaning apparatus for a disc record player, said player including a pickup stylus, said player being adapted for receiving said record in a first direction along a given path during loading of said record into said player and adapted for permitting withdrawal of said record in a second direction along said given path during unloading of said record from said player, said stylus cleaning apparatus comprising:

(A) a stylus cleaning element;
(B) means responsive to the position of said record along said given path during the travel of said record for causing said cleaning element to assume a first position; and
(C) means responsive to the position of said record along said given path during a further travel of said record for causing movement of said cleaning element from said first position to a second position;

said player being adapted to position said stylus such that said stylus is wiped by said cleaning element during the travel of said cleaning element from said first cleaning element position to said second cleaning element position.

* * * * *

UNITED STATES PATENT AND TRADEMARK OFFICE
CERTIFICATE OF CORRECTION

PATENT NO. : 4,285,524

DATED : August 25, 1981

INVENTOR(S): Larry M. Hughes and Kenneth L. George

It is certified that error appears in the above-identified patent and that said Letters Patent is hereby corrected as shown below:

Col. 1, line 7, "the" should be --a--.

Col. 1, line 33, "for" should be --from--.

Col. 7, line 10, "carry" should be --caddy--.

Signed and Sealed this

First Day of December 1981

[SEAL]

Attest:

GERALD J. MOSSINGHOFF

Attesting Officer     Commissioner of Patents and Trademarks